(No Model.) 6 Sheets—Sheet 3.

C. GLOVER.
SCREW CUTTING MACHINE.

No. 298,845. Patented May 20, 1884.

Witnesses:
John Edwards Jr
Eddy N. Smith

Inventor,
Charles Glover
By James Shepard
Atty.

(No Model.) 6 Sheets—Sheet 4.
C. GLOVER.
SCREW CUTTING MACHINE.
No. 298,845. Patented May 20, 1884.

Witnesses:
John Edwards Jr.
Eddy N. Smith

Inventor.
Charles Glover
By James Shepard
Atty.

(No Model.) 6 Sheets—Sheet 5.
C. GLOVER.
SCREW CUTTING MACHINE.
No. 298,845. Patented May 20, 1884.
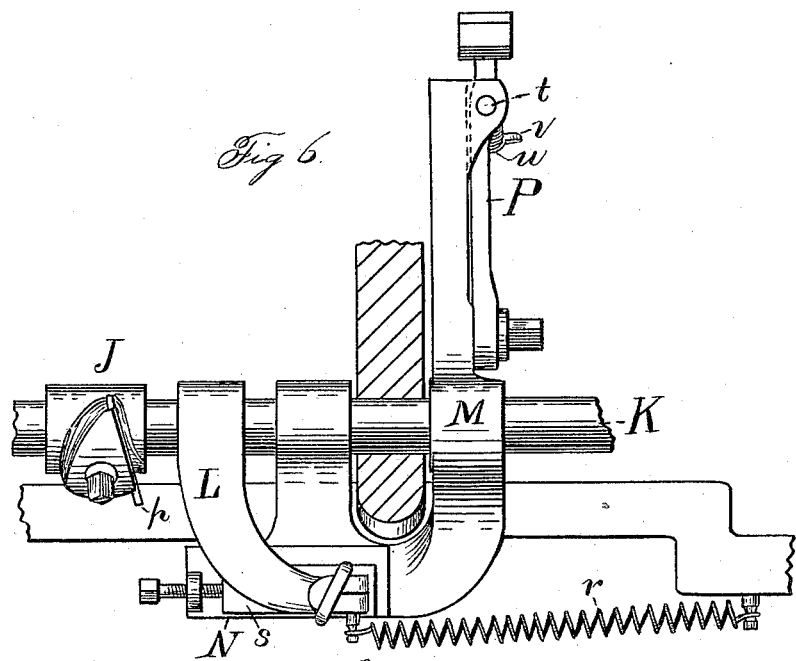
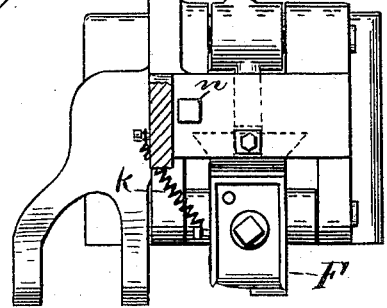
Witnesses:
John Edwards Jr.
Eddy N. Smith
Inventor
Charles Glover
By James Shepard
Atty (No Model.) 6 Sheets—Sheet 6.
C. GLOVER.
SCREW CUTTING MACHINE.
No. 298,845. Patented May 20, 1884.
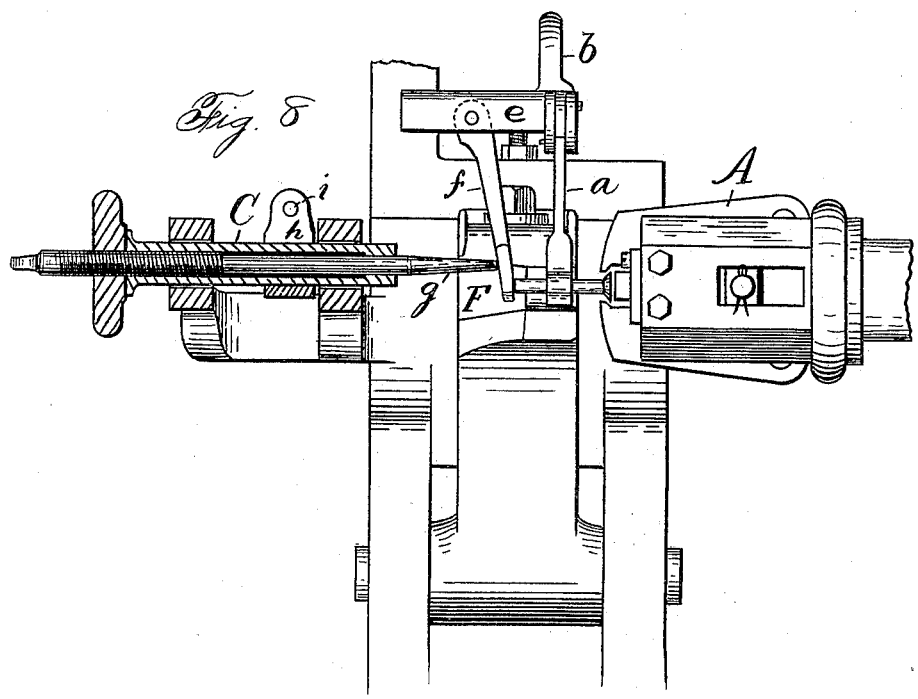

UNITED STATES PATENT OFFICE.

CHARLES GLOVER, OF HARTFORD, CONNECTICUT.

SCREW-CUTTING MACHINE.

SPECIFICATION forming part of Letters Patent No. 298,845, dated May 20, 1884.

Application filed December 26, 1883. (No model.)

*To all whom it may concern:*

Be it known that I, CHARLES GLOVER, a citizen of the United States, residing at Hartford, in the county of Hartford and State of Connecticut, have invented certain new and useful Improvements in Screw-Cutting Machines, of which the following is a specification.

My invention relates to improvements in machines for cutting screws; and the objects of my improvement are to facilitate the operation of placing the blank within the holding-jaws, to furnish means to prevent the chisel from breaking, and to better adjust the back rest which supports the screw during the cutting operation. I attain these objects by the mechanism illustrated in the accompanying drawings, in which—

Figure 1:
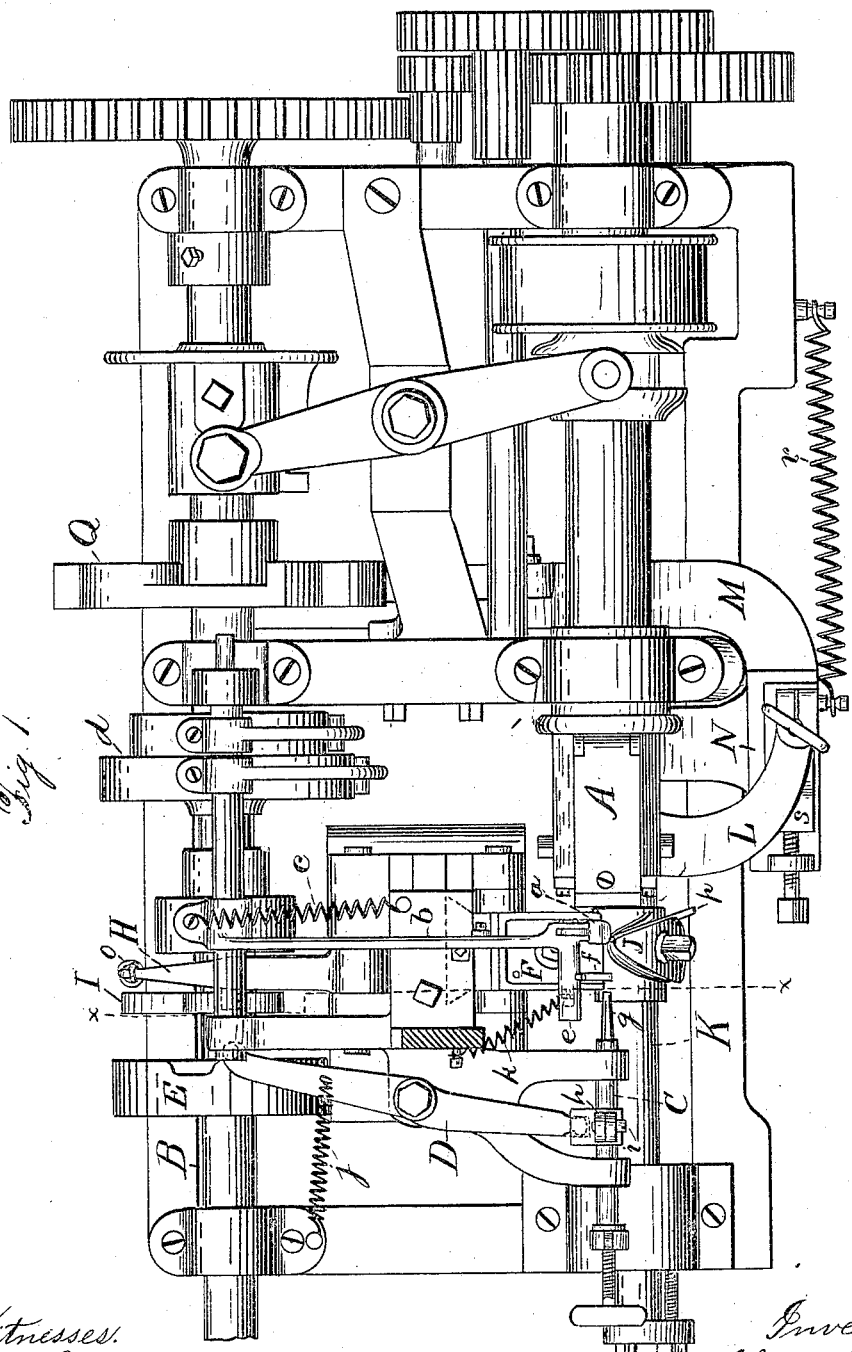
Figure 2:
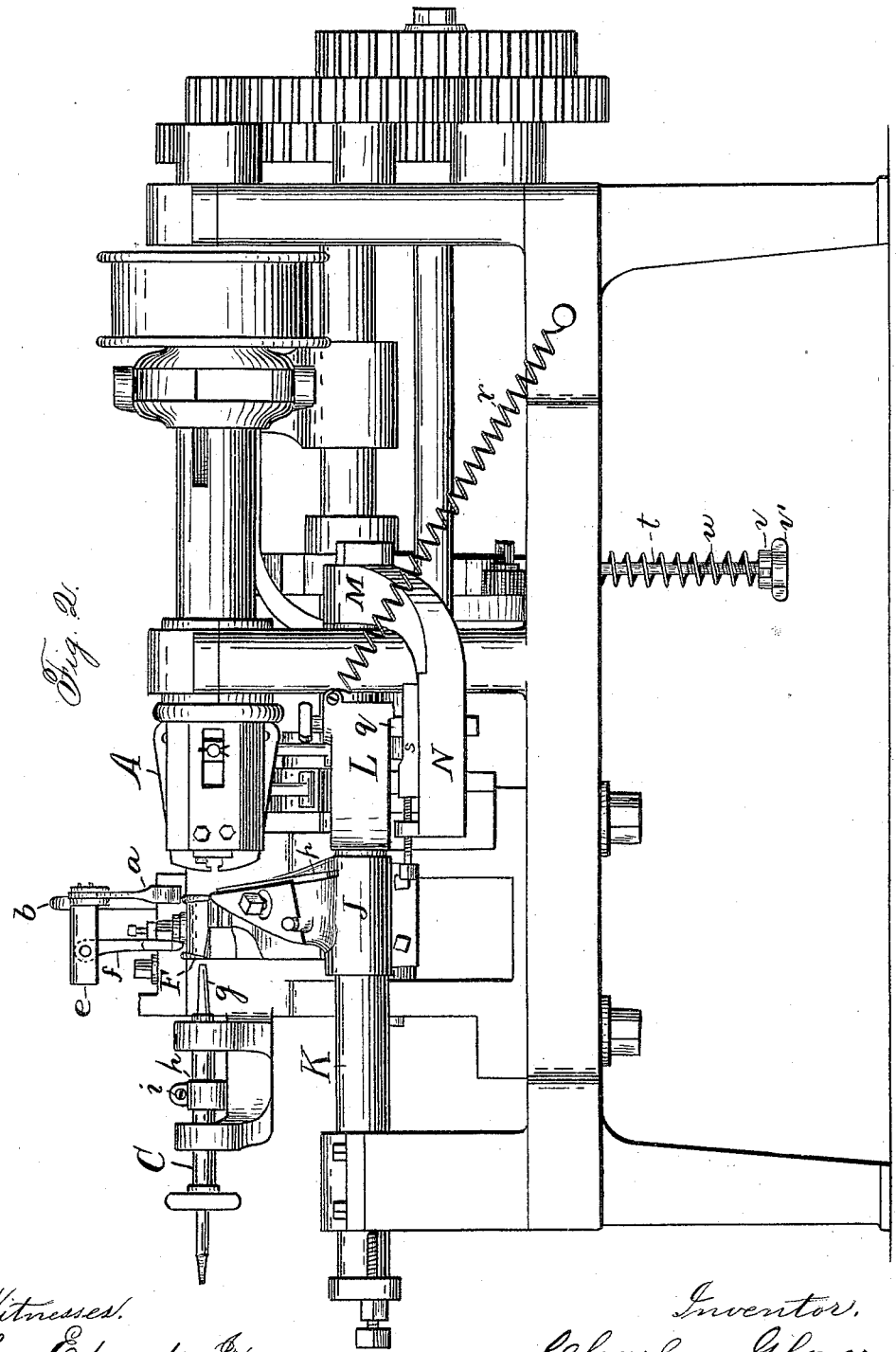
Figure 3:
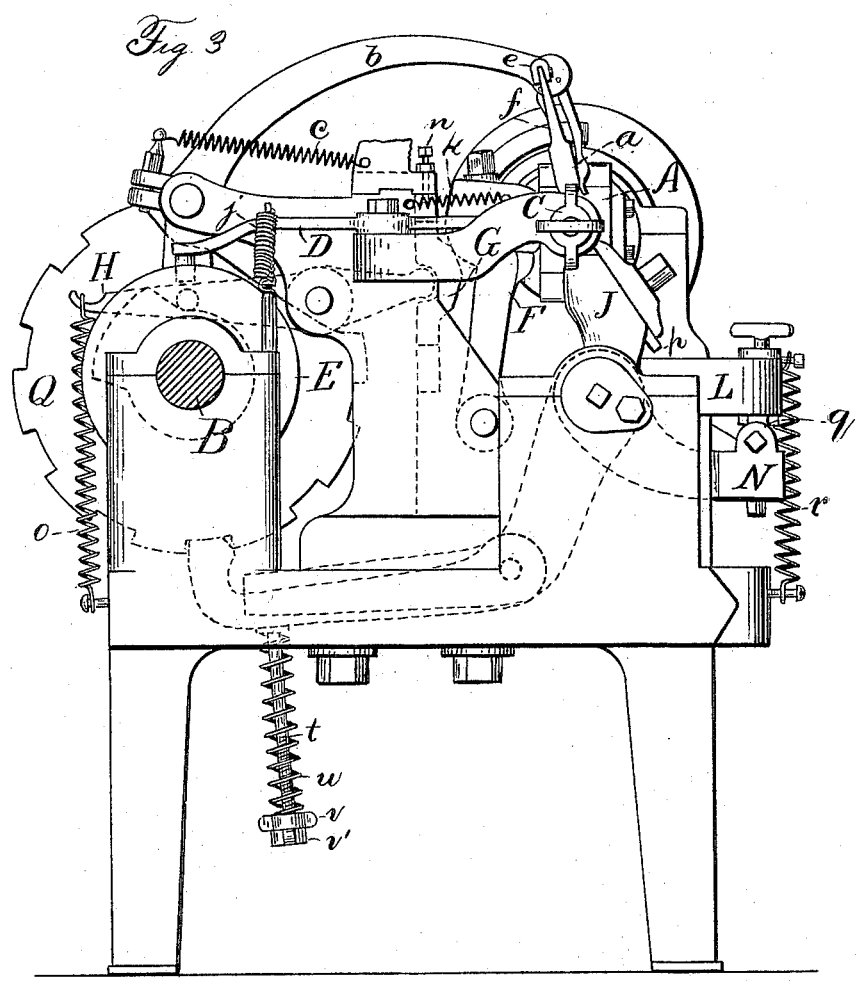
Figure 4:
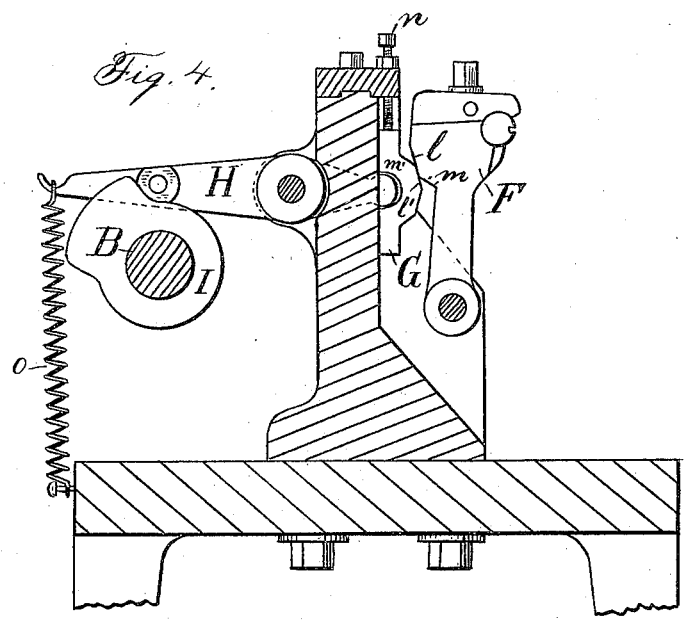
Figure 5:
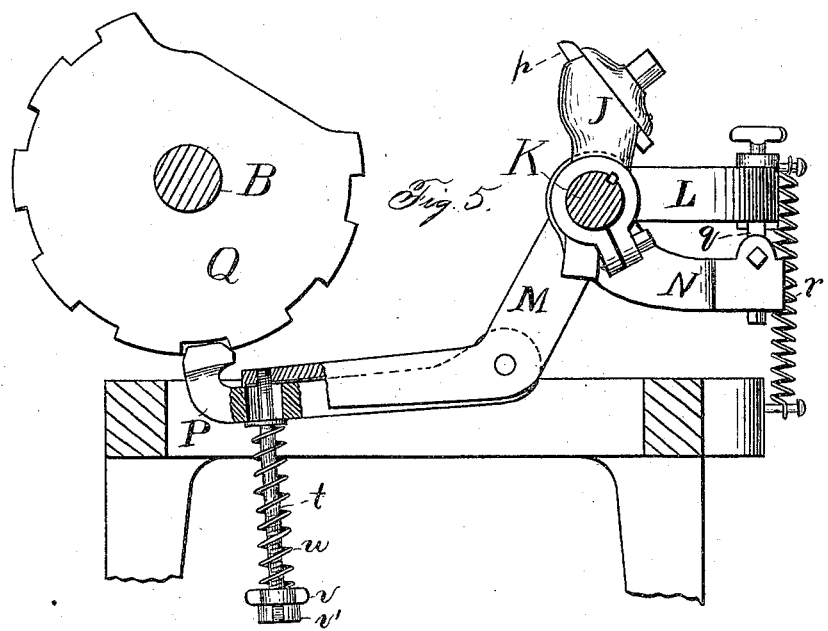

Figure 1 is a plan view of so much of a screw-cutting machine as is necessary to illustrate my improvement. Fig. 2 is a front elevation of the same. Fig. 3 is an end view of the same with the cam-shaft represented in transverse section. Fig. 4 is a vertical section of detached parts thereof on line $x\,x$ of Fig. 1, the same illustrating the manner of adjusting and operating the back rest. Fig. 5 is a detached side elevation, partly in transverse section, illustrating the manner of operating and relieving the cutting-chisel. Fig. 6 is a plan view of most of the parts represented in Fig. 5, together with a horizontal section of one of the standards upon which they are mounted. Fig. 7 is a plan view of the parts represented in Fig. 4; and Fig. 8 is a front elevation and partial vertical section, illustrating parts connected with the mechanism for pushing the screw-blank into the holding-chuck.

The main portion of this machine is such as I have heretofore used; and my present invention relates to improvements thereon, which will be specifically described, while those portions of the machine which are old will be referred to more indefinitely, with the exception of those old parts whose operation is immediately affected by my improvements.

A designates the holding-chuck, which may be of any ordinary construction. It is, however, illustrated as made and operated in accordance with improvements described in the Letters Patent No. 214,818, granted to me April 29, 1879.

B designates the cam-shaft, upon which the several cams are placed for operating the various parts, hereinafter described.

The machine is provided with the ordinary feeding arrangement by which the blanks are taken and fed into the holding-fingers $a$. These fingers are mounted upon a vibratory arm or lever, $b$, which lever is forced downward into the position illustrated in Fig. 8 by means of the spring $c$, Figs. 3, and upward by means of the cam $d$, Fig. 1, the same as in prior machines. I add to this arm the lateral extension $e$ and the pendent finger $f$, mounted on said extension, said pendent finger being long enough to reach as low as the end of the screw-blank when within the fingers $a$ when said fingers are in their most depressed position, as represented in Fig. 8. By the side of said pendent finger is a reciprocating slide, C, carrying the plunger-rod $g$, for acting upon the pendent finger $f$, as shown in Fig. 8. This plunger $g$ is made adjustable within the slide C by being fitted thereto with a screw-thread connection, as shown in Fig. 8. This is adjustably connected with its operating-lever D, Figs. 1 and 3, by means of the split collar $h$ and its clamp-screw $i$. (See Figs. 1, 2, and 8.) By loosening the clamp-screw the slide C can be adjusted to any desired position within the collar $h$, when the collar can be tightened in place by means of the clamp-screw. The collar $h$ is recessed upon its back side to admit the rounded lever D, as indicated by broken lines in Fig. 1. This slide C is moved back from the pendent finger $f$ by means of the cam E, and against said finger by means of the spring $j$, Figs. 1 and 3. A similar slide, but not adjustably secured to its lever, is found in the old machine; but in that case it was set lower down, so that the end of the plunger came in direct contact with the end of the screw-blank. The collar $h$ strikes against the frame in which the slide reciprocates, and thereby answers as a stop to limit the motion of the slide when it is moved forward by the spring. By adjusting the slide within the collar so great a range of adjustment for the plunger with the slide is not required as in the old structure. By the use of the pendent finger I am enabled to place this plunger higher up out of axial line with the holding-chuck, thereby bringing it up out of the way. When the fingers $a$ receive a screw-blank from the feeding mechanism and descend, so as to bring the blank in front of the holding-chuck, the plunger $g$ is forced against the pendent finger, causing it to swing and bring its lower end in contact with the end of the screw-blank and knock the screw-blank into the open chuck-jaws, as shown in Fig. 8. The chuck-jaws are then closed upon the blank, and the holding-fingers $a$ and the pendent finger $f$ are raised out of the way, and the back rest, E, brought forward to support the blank. This rest consists of a block and swinging arm, and is held back by means of the spring $k$, Figs. 1 and 3. The change which I make in this back rest is in its rear beveled faces, $l\,m$, and in the parts acting in connection therewith. Back of this rest, and mounted to slide vertically in suitable ways, is a cam-block, G, Figs. 3 and 4, having beveled faces $l'\,m'$, of which $l'$ is beveled on a corresponding angle with the beveled face $l$ on the back rest and the face $m'$ on a corresponding angle with the face $m$. The upward movement of the sliding block G is limited by means of the set-screw $n$, which can be adjusted to stop said block at any desired height. The rear side of the block G is recessed to receive the rounded end of the lever H, which lever is forced upward by means of the cam I and downward by means of the spring $o$. When this lever is flung upward, the slide G is depressed and the back rest is allowed to fall back with its face $m$ just over the face $m'$ of the sliding block. So soon as the cam I releases its hold upon the lever H the spring $o$ depresses said lever and throws the sliding block upward, bringing the faces $m\,m'$ into contact and forcing the back rest forward, after which the beveled faces $l\,l'$ come into engagement, as shown in Fig. 4. Thus it will be seen that the back rest is supported when in its position for work by means of the beveled faces $l\,l'$, and consequently that said rest will be thrown forward a greater or less distance, as may be desired, by adjusting the stop to limit the upward movement of the block G to different heights. It will of course be understood that the back rest is held forward while the screw-blank is being threaded.

In order to prevent the breaking of chisels when too large a blank accidentally gets into the chuck, or when, from any cause, an undue strain is brought to bear upon the cutting-tool $p$, I make use of the following apparatus: This chisel $p$ is mounted in a suitable tool-holder, J, which tool-holder has an oscillating movement with the shaft K, to which it is rigidly secured. Said shaft has also rigidly connected to it an arm, L, which projects forward, and is provided with a projecting piece, $q$, upon its under side. This arm is held downward, and consequently the chisel held backward, by means of the spring $r$. Loosely mounted upon the same shaft K is a lever, M, said lever being provided with an arm, N, which bears the shoe $s$, upon which the projection $q$ of the arm L rests.

To the rear end of the lever M, and forming a part thereof, is jointed the arm P, the rear end of which engages with the cam Q. The rear end of the lever M is also provided with a laterally-extending ear in which to mount the rod $t$. The adjacent part of the arm P is provided with a side swell, and is slotted for the passage of the rod $t$, as shown in Fig. 5, in which figure parts of M and P are broken out, so as to represent them partially in section. A spring, $u$, is placed upon the rod $t$, and has a constant tendency to hold the arm P in contact with the lever M and make the two act together as one lever, except in certain contingencies. When the cam Q operates to depress the rear end of the lever N, it throws the arm M upward, when the shoe $s$, bearing on the projection $q$, will throw the arm L upward and rotate the shaft K, so as to throw the tool-holder J and chisel $p$ forward into cutting action. The strength of the spring $u$ is intended to be sufficient to hold the chisel into cutting action during its ordinary operation, the same as if the lever M were a rigid one. If, however, any undue strain is brought upon the chisel, the spring $u$ will yield and allow the chisel to work back out of the way, and thereby prevent its breakage.

In order to adjust the tension of the spring so as to hold the chisel firmly when making a larger or smaller cut, and also leave it so that it will yield readily in case that more work is put upon it than that for which it is adjusted, I thread the lower end of the rod $t$ and provide the same with a nut, $v$, and preferably with a stop-nut, $v'$. By compressing the spring more or less with the nut $v$, the desired strength of the spring may be attained. In this chisel-holding apparatus, the principal change which I make is in the jointed arm P and its adjustable relief-spring.

Those parts of the machine which are not specifically described operate the same as in prior machines now in use, and it is deemed unnecessary to describe them.

I claim as my invention—

1. The combination of the pendent finger $f$, the plunger $g$, and their operating mechanism, substantially as described, and for the purpose specified.

2. The combination of a holding-chuck, gripping-fingers for bringing a screw-blank in front of said chuck, the pendent finger, and the reciprocating plunger for acting upon said finger, the finger in turn acting upon the end of the screw-blank, substantially as described, and for the purpose specified.

3. The combination of the slide C, having the adjustable plunger mounted therein, the collar $h$, made adjustable longitudinally upon said slide, and reciprocating mechanism acting upon said collar to operate it and the slide, substantially as described, and for the purpose specified.

4. The combination of the sliding block G, having the beveled face $l'$, the back rest, F, having the beveled face $l$, and mechanism for reciprocating the slide, substantially as described, and for the purpose specified.

5. The combination of the sliding block G, having the beveled face $l'$, the back rest, F, having the beveled face $l$, mechanism for reciprocating said block G, and an adjustable stop to limit the extent of the upward movement of said block, substantially as described, and for the purpose specified.

6. The combination of the oscillating tool-holder, its driving-lever, driving-cam, the jointed arm P, attached to said driving-lever, and the spring $u$, substantially as described, and for the purpose specified.

7. The combination of the oscillating tool-holder, its driving-lever, driving-cam, the relief-spring $u$, and mechanism for adjusting the pressure of the spring, substantially as described, and for the purpose specified.

CHARLES GLOVER.

Witnesses:
JAMES SHEPARD,
EDDY N. SMITH.